(12) United States Patent
Christopher

(10) Patent No.: US 7,226,105 B2
(45) Date of Patent: Jun. 5, 2007

(54) HYDRAULIC VEHICLE SEAT ADJUSTMENT WITH SYSTEM PROTECTION VALVE

(75) Inventor: Hugh H. Christopher, West Bridgford (GB)

(73) Assignee: Lear Corporation, Southfield, MI (US)

(*) Notice: Subject to any disclaimer, the term of this patent is extended or adjusted under 35 U.S.C. 154(b) by 195 days.

(21) Appl. No.: 10/971,428

(22) Filed: Oct. 22, 2004

(65) Prior Publication Data

US 2005/0088006 A1 Apr. 28, 2005

(30) Foreign Application Priority Data

Oct. 22, 2003 (GB) ................. 0324558.6

(51) Int. Cl.
*B60N 2/02* (2006.01)
(52) U.S. Cl. ............... 296/65.08; 296/65.12; 297/216.13; 297/362.13
(58) Field of Classification Search ............ 296/65.08, 296/65.09, 65.11, 65.12, 65.15, 65.17, 65.18; 297/216.13, 216.14, 362.13, 344.16, 344.19
See application file for complete search history.

(56) References Cited

U.S. PATENT DOCUMENTS

| | | | |
|---|---|---|---|
| 3,760,911 A | 9/1973 | Porter et al. | |
| 3,777,617 A | 12/1973 | Okiyama | |
| 3,860,098 A | 1/1975 | Porter et al. | |
| 3,927,911 A | 12/1975 | Rosquist | |
| 4,550,750 A | 11/1985 | Korth | |
| 4,720,143 A | 1/1988 | Schwartz et al. | |
| 5,435,625 A | 7/1995 | Weber | |
| 5,743,591 A | 4/1998 | Tame | |
| 6,015,130 A | 1/2000 | Kigel | |
| 6,047,797 A | 4/2000 | Popjoy | |
| 6,059,253 A | 5/2000 | Koutsky et al. | |
| 6,142,564 A | 11/2000 | Pajela et al. | |
| 6,161,633 A | 12/2000 | Broom | |
| 6,382,491 B1 | 5/2002 | Hauser et al. | |
| 6,817,646 B2 * | 11/2004 | Kikuchi et al. | ......... 296/65.05 |
| 2002/0130542 A1 | 9/2002 | Ellerich et al. | |
| 2003/0209929 A1 | 11/2003 | Muin et al. | |

FOREIGN PATENT DOCUMENTS

| | | |
|---|---|---|
| DE | 202 15 969 | 2/2003 |
| DE | 101 52 561 | 5/2003 |
| EP | 0 316 675 | 5/1989 |
| EP | 0 878 348 | 11/1998 |

(Continued)

*Primary Examiner*—Stephen Gordon
(74) *Attorney, Agent, or Firm*—MacMillan, Sobanski & Todd, LLC

(57) ABSTRACT

A hydraulic vehicle seat system providing powered adjustment of the position of a seat or seat portion. The system comprises a pump, flow controller, and hydraulic actuator arranged in a hydraulic circuit. The actuator includes a first and second system protection valves for the respective inlet and outlet of the actuator. The system protection valves are adapted to be activated in response to pressure within the actuator exceeding a predetermined threshold level. When activated the system protection valves close off the respective inlet and outlets to hydraulically isolate the actuator and hydraulic fluid within the actuator from the remainder of the hydraulic circuit and adjustment system. This protects the remainder of the circuit and system from excessive pressures which may be generated within an by the actuators under crash loading.

15 Claims, 4 Drawing Sheets

FOREIGN PATENT DOCUMENTS

| | | |
|---|---|---|
| EP | 1 077 153 | 2/2001 |
| EP | 1 188 608 | 3/2002 |
| GB | 897955 | 6/1962 |
| GB | 2 167 494 | 5/1986 |
| GB | 2 173 344 | 10/1986 |
| GB | 2 365 947 | 2/2002 |
| JP | 2000-289507 | 10/2000 |
| WO | 03/026921 | 4/2003 |

* cited by examiner

HYDRAULIC VEHICLE SEAT ADJUSTMENT WITH SYSTEM PROTECTION VALVE

CROSS REFERENCE TO RELATED APPLICATIONS

This application claims priority to Great Britain Patent Application No. 0324558.6 filed Oct. 22, 2003, the disclosures of which are incorporated herein by reference.

BACKGROUND OF THE INVENTION

The present invention relates to a vehicle seats, in particular to hydraulically or fluid powered adjustable automotive vehicle seats.

In order to comfortably accommodate various sizes and shapes of occupants vehicle seats are generally provided with various adjustment mechanisms to adjust the position of the seat within the vehicle and/or move various movable portions of the seat. Typically vehicle seats are provided with fore and aft adjustment, and the seat back is pivotally mounted to a seat bottom cushion such that the angle of the seat back to the bottom cushion of the seat can be adjusted. Other adjustment and adjustment mechanisms may also be provided to for example adjust the height of the vehicle seat, angle and tilt of the seat bottom cushion, position of the headrest, and/or the lumber support. The seat adjustment mechanisms may be manually operable, or increasingly some or all may be power operated. Conventionally such power operated adjustment mechanisms comprise separate electric motors mounted within the seat driving each adjustment mechanism though suitable gearing. The individual motors are controlled via switches operable by the seat occupant with a central seat adjustment control unit often being incorporated.

Whilst such electrically powered adjustable seats are commonplace, the electric motors and associated gearing can often be relatively and undesirably noisy as well as providing often jerky movement and adjustment. As increasing seat adjustment, and powered seat adjustments, are demanded and provided the number of electric motors required also increases. This increases costs and weight of the vehicle seat and furthermore the additional motors and gearing take up increasing space within the seat assembly.

Hydraulic or fluid powered seat adjustment mechanisms have been proposed instead of the electric powered systems. Indeed the earliest of such proposals date back a number of years. A distinction should however be drawn between hydraulic or fluid powered adjustment systems, and the more basic and simple and hydraulic locking systems and/or damper arrangements.

In such hydraulic or fluid powered arrangements pressurised fluid, provided from a pump, is supplied via a control valve to piston/cylinder actuators. These actuators move and directly adjust the position of the seat or portions of the seat to be adjusted. Such hydraulic powered arrangements offer the prospect of extremely quiet, near silent, operation, without the noisy mechanical gearing. Smooth and almost infinitely variable adjustment is also possible with such hydraulic powered arrangements.

In spite of these, and other, advantages of hydraulically powered seat adjustments they have not been adopted for widespread automotive vehicle seat use over the considerable number of years since they have initially been proposed. Overall, and although hydraulics are used in other areas in automotive vehicles (for example braking systems), those skilled in the art of vehicle seat design would not generally from a practical stance consider using hydraulic powered seat adjustment systems. Indeed the conventional trend is away from hydraulics in general in automotive applications and to electric powered systems.

One of the main reasons for this is the cost of such previously proposed hydraulic systems. It is also perceived that such hydraulic systems are complex. In addition to comply with automotive crash loading requirements the seat must provide sufficient structural strength and withstand high crash loading without failing or allowing excessive movement of the seat or portion thereof. In particular under crash loading the forces applied to the seat may generate extremely high pressures, for example in the region of 1700 bar, within the hydraulic system and pump, pipework and actuators. The hydraulic system must be capable of withstanding these high crash loading pressures. This increases the sizing of the pipework, pump and actuators and the quality to which they must be made and assembled and the resultant costs.

It is therefore desirable to provide an improved hydraulically powered automotive vehicle seat adjustment system which addresses the above described problems and/or which offers improvements generally.

SUMMARY OF THE INVENTION

According to the present invention there is provided a hydraulic vehicle seat adjustment system as described in the accompanying claims.

In an embodiment of the invention there is provided a hydraulic vehicle seat adjustment system providing powered adjustment of the position of a seat or seat portion. The system comprises a pump, flow controller, and hydraulic actuator arranged in a hydraulic circuit. The pump generates a flow of pressurised hydraulic fluid. The flow controller for controls and directs the flow of pressurised hydraulic fluid. The hydraulic actuator comprises a first inlet/outlet and a second inlet/outlet. The actuator is adapted to move the portion of a vehicle seat in response to a flow of pressurised hydraulic fluid directed to and from the first inlet/outlet and second inlet/outlet by the flow controller. The actuator further comprises a first system protection valve for the first inlet/outlet of the actuator and second system protection valve for the second inlet/outlet of the actuator. The first and second system protection valves are adapted to be activated in response to pressure within the actuator exceeding a predetermined threshold level. When activated the system protection valves close off the respective inlet/outlet to hydraulically isolate the actuator and hydraulic fluid within the actuator from the remainder of the hydraulic circuit and adjustment system.

The system protection valves, located within or closely adjacent to the actuator, protect and isolate the remainder of the system from the high pressure which may be generated for example under crash loading. Consequently the remainder of the system including the relatively expensive pump and valves, as well as pipework, do not need to be designed or manufactured to withstand such high pressure. As a result costs can be reduced allowing a practical implementation of a hydraulic powered seat adjustment. In addition pressure can be more readily contained within the actuators than within pumps and flow controllers (control valves) as well as any pipe connectors. Furthermore by locating the system protection valves within the actuators the volume of the high pressure fluid to be contained is minimised and the pressure constrained at the point where they arise. The system protection valves, closing off the inlet/outlets of the actuators also prevent or restrict fluid flow form the actuators, in conjunction with the flow controller, thereby more securely prevent movement of the seat or seat portions in the event of crash loading or other high loading applied to the seat.

An actuator chamber is defined within the actuator and an end of the respective inlet/outlet is in fluid communication with the actuator chamber. The system protection valves may each comprise a movable closure portion which extends over the end of the inlet/outlet and which is movable from a first position to a second activated position. In the first position the closure portion is spaced from the end of the inlet/outlet to allow fluid flow between the actuator chamber and inlet/outlet through the end of the inlet/outlet. In the second activated position the closure portion abuts against and closes off, or at least partially/significantly closes off, the opening.

The closure portion may be deformably mounted within the actuator spaced from the end of the inlet/outlet. The pressure of hydraulic fluid within the actuator when the pressure exceeds the predetermined threshold level is arranged to deform the mounting of the closure portion to activate the system protection valve and move the closure portion to the second position. In a preferred arrangement the end of the inlet/outlet comprises an annular duct. Each system protection valve comprises frusto-conical element mounted coaxially over the duct such that a distal portion of the frusto-conical element is spaced from a plane perpendicular to the axis of the duct. The frusto-conical element is adapted to be deformed and flattened to a planar shape by the hydraulic pressure within the actuator chamber when the pressure exceeds the predetermined threshold level such that the flattened element covers and closes off (or at least partially/significantly closes off) the duct.

Such deformable arrangements provide a simple, cheap and reliable system protection valve arrangement.

Alternatively the closure portion may be biassed into the first position by a biassing spring which provides a predetermined biassing force which has to be overcome by the pressure within the actuator chamber to activate the protection valve.

Such a biassing spring arrangement allows the closure portion to return to the first position, allowing the seat adjustment to operate normally once the high pressure within the actuator has reduced.

The spacing of the closure portion from the end of the inlet/outlet preferably defines a conduit of a reduced cross sectional flow area which throttles the flow of hydraulic fluid through the inlet/outlet. The pressure within the actuator exceeding the predetermined threshold level may be generated by an induced required flow through the inlet/outlet exceeding a predetermined level.

Preferably the actuator comprises a double acting piston mounted within a cylinder. The actuator comprises a cylinder, and a pair of end caps attached to the cylinder and which close off either end of the cylinder. The first and second inlet/outlets are defined by respective conduits within the respective end caps, and the first and second system protection valves comprise part of the respective end caps.

Typically there are a plurality of actuators adapted to move a respective plurality of seat portions of a vehicle seat; and there are a plurality of corresponding flow controllers for controlling and directing the flow of pressurised hydraulic fluid to corresponding actuators.

The seat comprises a movable seat back and the actuator is adapted to move the seat back and to adjust and set the angle of the seat back. Actuators may also be adapted to move the fore and aft position of the seat within the vehicle.

Other advantages of this invention will become apparent to those skilled in the art from the following detailed description of the preferred embodiment, when read in light of the accompanying drawings.

BRIEF DESCRIPTION OFF THE DRAWING

DETAILED DESCRIPTION OF THE INVENTION

Figure 1:
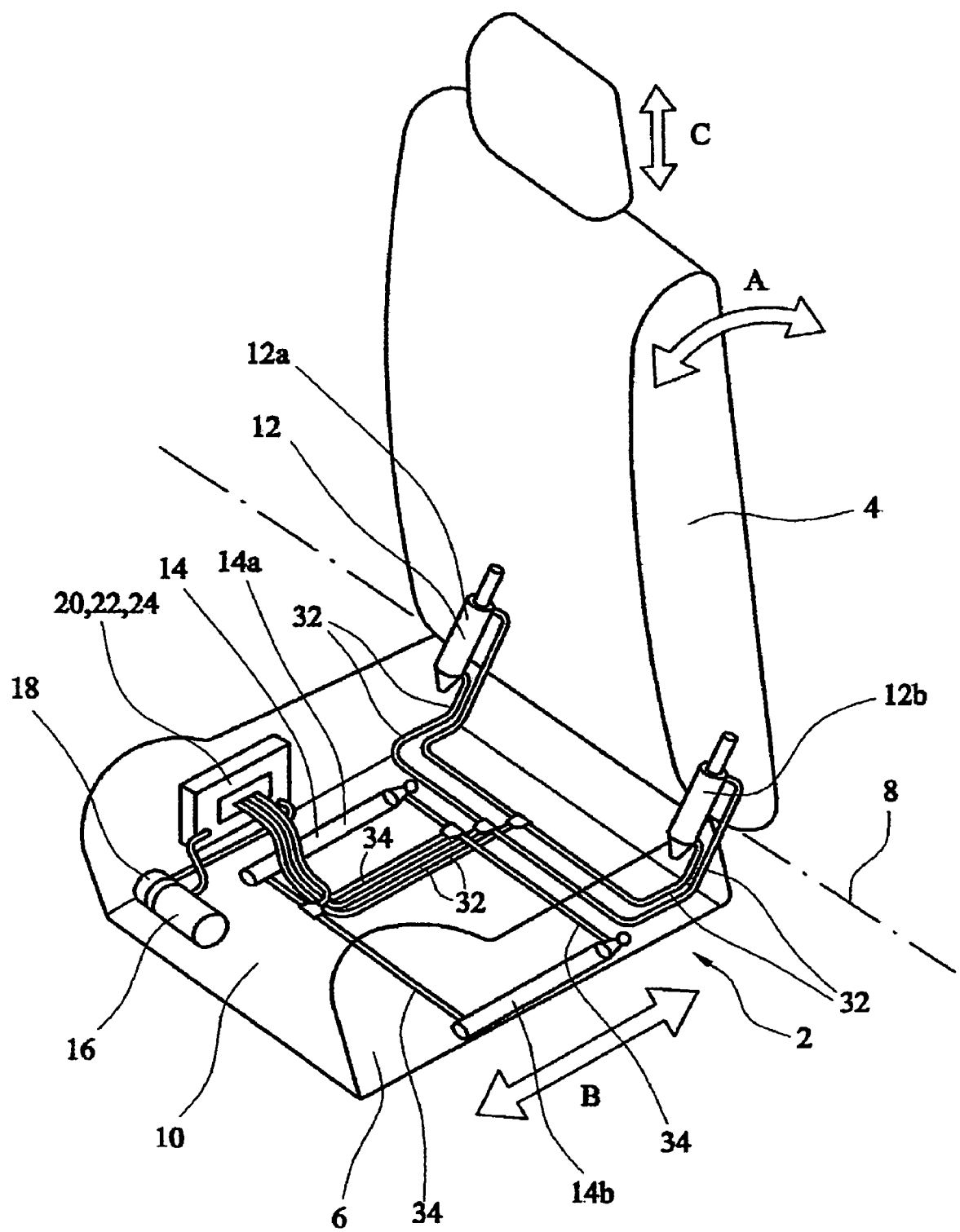
FIG. 1 is a schematic perspective illustration showing the general disposition of a hydraulic vehicle adjustment system of an embodiment of the invention within a vehicle seat.

Referring to FIG. 1 there is shown a schematic illustration of the disposition of a hydraulically powered seat adjustment system 10 within an outline of an automotive vehicle seat 2. The vehicle seat 2 includes a seat back 4 which is pivotally connected to a bottom seat cushion 6, in a conventional manner, at one end about a horizontal lateral axis 8 such that the angle of the seat back 4 can be adjusted relative to the generally horizontally disposed seat bottom cushion 6 as indicated by arrow A. The seat bottom cushion 6 is slidably mounted to the vehicle floor (not shown) in a conventional manner, for example using a pair of sliding seat tracks or rail assemblies (not shown), to allow the seat cushion 6 and seat 2 to be slid fore and aft as indicated by arrow B. The fore and aft position of the seat 2, and angle of the seat back 4, are adjusted and secured in position by a powered hydraulic adjustment system 10 operated by a seat occupant.

Figure 2:
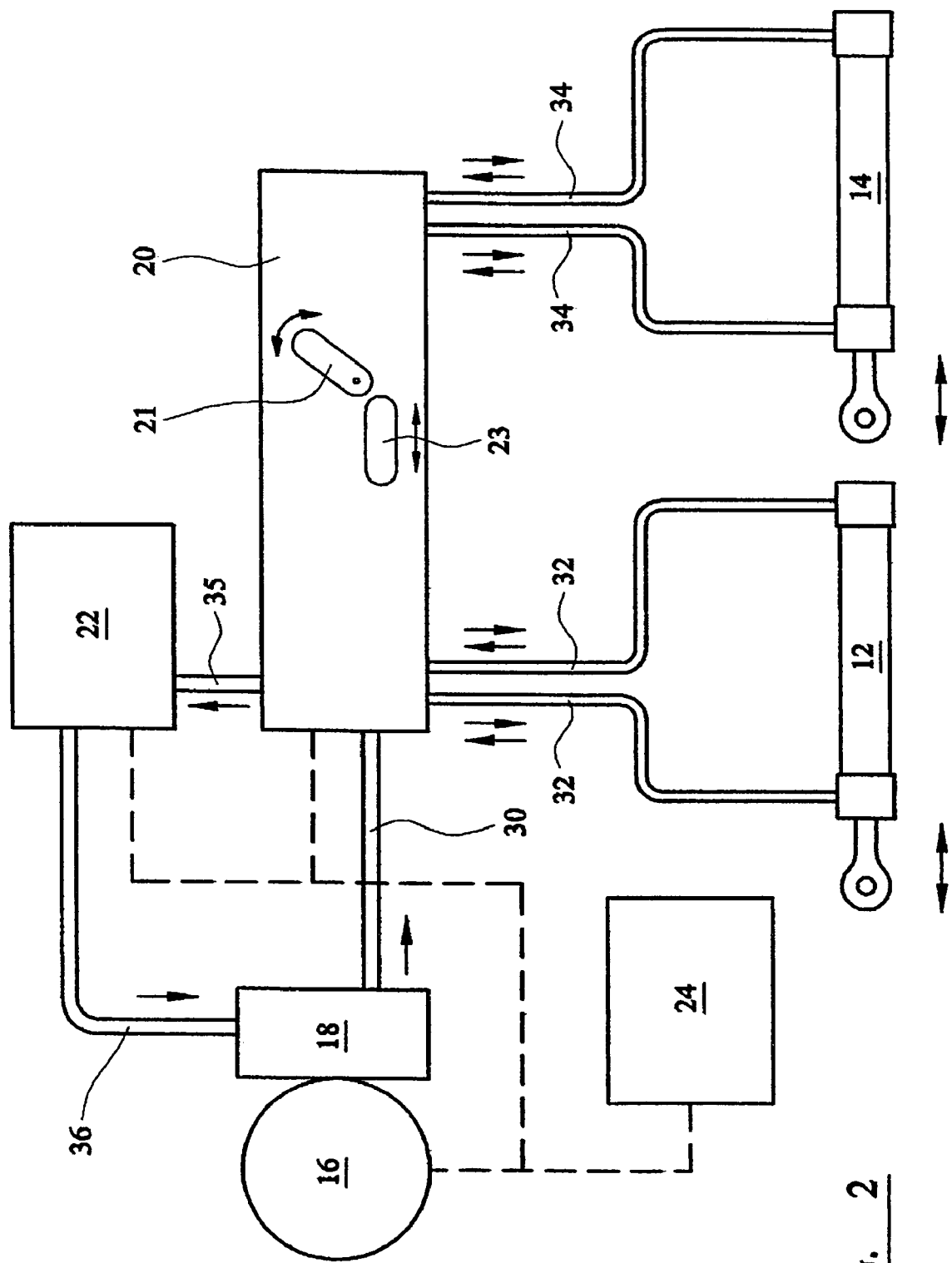
FIG. 2 is a schematic simplified illustration of the hydraulic vehicle adjustment system of FIG. 1.

The hydraulic adjustment system 10 is shown schematically in FIG. 2. The hydraulic adjustment system 10 comprises a hydraulic pump 18 driven by an electric motor 16 preferably mounted on, and underneath the seat 2. Alternatively the pump 18 and motor 16 may be mounted remotely from the seat 2 and connected to the seat 2 via pipework and electrical cables. The pump 18 is connected to and in fluid communication with a control module 20 to supply pressurised hydraulic fluid via a supply pipe 30 to the control module 20. The control module 20 includes control valves (not shown) which selectively in use direct and control a flow pressurised fluid supplied from the control module 20 to a number of hydraulic actuators 12, 14 via actuator supply/return pipes 32, 34. The hydraulic actuators 12, 14 are arranged to set and drivingly adjust the various powered seat adjustments. In this embodiment the actuators 12, 14 comprise seat pivot actuators 12 to adjust and set the seat back 4 angle, and seat track actuators 14 to adjust and set the seat 2 fore & aft position. Supply/return pipes 32, 34 return the hydraulic fluid from the hydraulic actuators 12, 14 via the control module 20, and further control valves, to a reservoir 22 which stores an operating quantity of hydraulic fluid. The hydraulic fluid is supplied from the reservoir 22 to the pump 18 via a pump feed pipe 36. An electronic control unit 24 is preferably operatively connected to the motor 16, control module 20 and various other sensors (not shown), for example monitoring the quantity of fluid in the reservoir 22, to monitor and control the operation of the hydraulic adjustment system 10.

The system preferably operates at a relatively low hydraulic pressure, typically 20 bar, which is considerably lower than typical hydraulic systems. At such a low operating pressure the hydraulic pipes 30, 32, 34, 35, 36, pump 18 and valves can be of relatively lightweight construction and sealing problems and leakages are reduced. This reduces the complexity of the system 10 and so costs.

Whilst in FIG. 2 only a single representative actuator 12, 14 is shown for each seat adjustment, as shown in FIG. 1, the hydraulic seat pivot actuator 12 comprises a pair of hydraulic seat pivot actuators 12a,b at either lateral side of the seat 2. These actuators are connected at either end to the seat bottom cushion 6 and seat back 4 respectively at positions spaced from the pivot axis 8. The pair of hydraulic seat pivot actuators 12a,b are hydraulically connected together in parallel, with the hydraulic supply/return pipes 32 from the control module 20 to the actuators 12a, 12b splitting and branching off to each actuator 12 as illustrated in FIG. 1. The pivot actuators 12a,b comprise hydraulic piston and cylinders which extend-retract in response to a flow of pressurised hydraulic fluid supplied to the pivot actuators. Extension and retraction of the pivot actuators 12 pivots and adjusts the angle the seat back 4 relative to the seat cushion 6 with the pivot actuators 12 setting and adjusting the seat back 4 position and angle relative to the seat cushion 6.

Similarly the seat track actuators 14 comprise a pair of seat track actuators 14a,b associated with the seat track assemblies and located at either lateral side of the seat 2. One end of the seat track actuator 14a,b is connected to the seat cushion 6 and the other to the vehicle floor, or respective sliding parts of the seat track or rail assemblies. The actuators 14a,b comprise hydraulic piston and cylinders which extend-retract in response to a flow of pressurised hydraulic fluid supplied to the track actuators 14a,b. Extension and retraction of the actuators 14 adjusts and sets the fore and aft position of the seat cushion 6 relative to the vehicle floor.

It will be appreciated that the seat 2 may be mounted to provide for other movement for example adjust the height of the vehicle seat 2, and/or angle and tilt of the seat bottom cushion 6. The seat 2 may also include further movable portions for example a movable headrest, and/or the lumber support. Further pairs of actuators, or single actuators, may accordingly be similarly provided for such further adjustable mountings and/or movable portions. Such further actuators are further similarly connected to the control module 20 and further control valves therein in a similar manner to the seat track actuators 14 and seat pivot actuators 12. In general for structural adjustments where the adjustment mechanism may be subject to high crash loading and where there are regulatory crash test requirement to maintain the correct position, for example seat back 4 position or seat 2 fore-aft position, pairs of actuators 12, 14 are used to provide structural integrity. For, so called, comfort adjustments for example lumber or headrest position a single actuator may be used.

The control module 20 includes a number of supply valves to selectively direct pressurised fluid supplied to the control module 20 from supply 30 to respective supply/return pipes 32, 34 for the actuators 12, 14. The control module 20 also includes corresponding return valves to correspondingly connect the respective corresponding return/supply pipe 32, 34 for the actuators 12, 14 to allow fluid displaced from the actuators 12, 14 by their operation to be returned to the reservoir 22 via return pipe 35. In operation the pressurised fluid may accordingly be selectively supplied to each actuator 12, 14 via either supply/return pipe 32, 34 for each actuator 12, 14 (and returned via the corresponding other supply feed pipe 32, 34) in opposite flow directions to operate and move the actuator 12, 14 in either opposite respective direction. The respective supply and return valves within the control module are operated in unison by operator switches 21, 23 operated by a seat occupant. As shown in FIG. 2 the switches may comprise movable switches 21, 23 representative of the vehicle seat 2 with the seat back 4 switch 21 being pivotable to control pivoting of the seat back 4 and the seat fore and aft switch 23 being slidable fore and aft to control the fore and aft position. The control module 20 is preferably mounted on a side valance of the seat 2 within reach of the seat occupant, with the switches 21, 23 comprising part of the control module 20 and directly (or via suitable linkages) operating the valves. Alternatively the switches 21, 23 may comprise electrical switches which operate valve actuator solenoids (not shown) to operate the valves. Such electrical switches and solenoids may be operated and controlled via the ECU 24. This ECU, as is conventional, may further include suitable memory elements and control means to selectively activate the valves provides seat adjustment.

The motor 16 and pump 18 are arranged to only operate and supply pressurised fluid to the control module 30 when required and accordingly when the switches 21, 23 are operated. Alternatively an automatic pump and motor arrangement can be used in which the pressure in the feed line 30 is monitored and constantly kept pressurised at a nominal operating pressure by the operation of pump 18. The pump 18 and motor 16 is arranged to automatically start in response to a sensed pressure drop caused by operation of one of the valves, and automatically stops in response to a pressure rise over a specific level due to closure of one of the valves.

In operation to adjust for example the angle of, and recline, the seat back 4 a seat occupant presses or moves the respective switch 21 on the control module 20 on the side valance of the seat 2. This operates the respective supply and return valves within the control module 20 to interconnect and direct hydraulic fluid from the supply pipe 30 to one of the supply/feed pipes 32 connected to the seat pivot actuator 12, and to interconnect and direct hydraulic fluid from the other of the supply/feed pipes from the seat pivot actuator 12 to the return pipe 35. At the same time the switch 21, movement of the valves, or the pressure change in the supply pipe 30 activates the motor 16 and pump 18 to generate a flow of pressurised hydraulic fluid which is supplied and directed to the seat pivot actuator 12 causing the actuator 12 to extend and recline the seat back 4. Once the desired reclined position is achieved the occupant releases the switch 21, which closes the valves and stops the pump 18. The closed valves prevent flow of fluid from the supply/feed pipes 32 thereby preventing further movement of the seat pivot actuator 12 and so secures the seat back 4 in the desired position. To move the seat back 4 to a more upright position the switch 21 is moved in the opposite sense, or a second switch is pressed, which operates the valves to direct and interconnect the supply/feed pipes 32 to the supply 30 and return 35 in the opposite manner such that the pivot actuator 12 retracts moving the seat back 4 to a more upright position.

Figure 3:
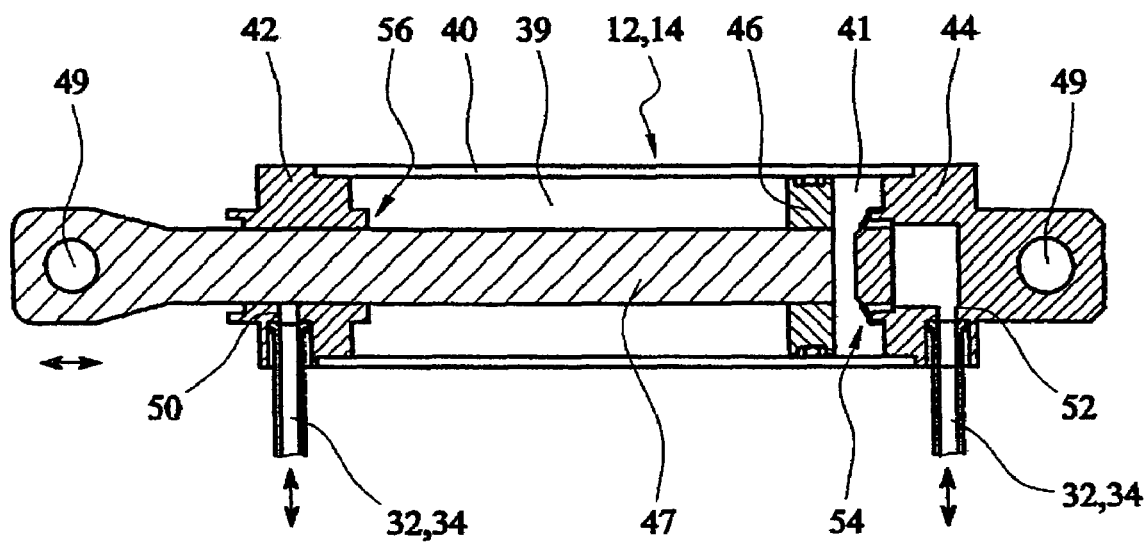
FIG. 3 is an illustrative cross section through one of the actuators shown generally in FIGS. 1 and 2 according to a first embodiment of the invention.
Figure 4:
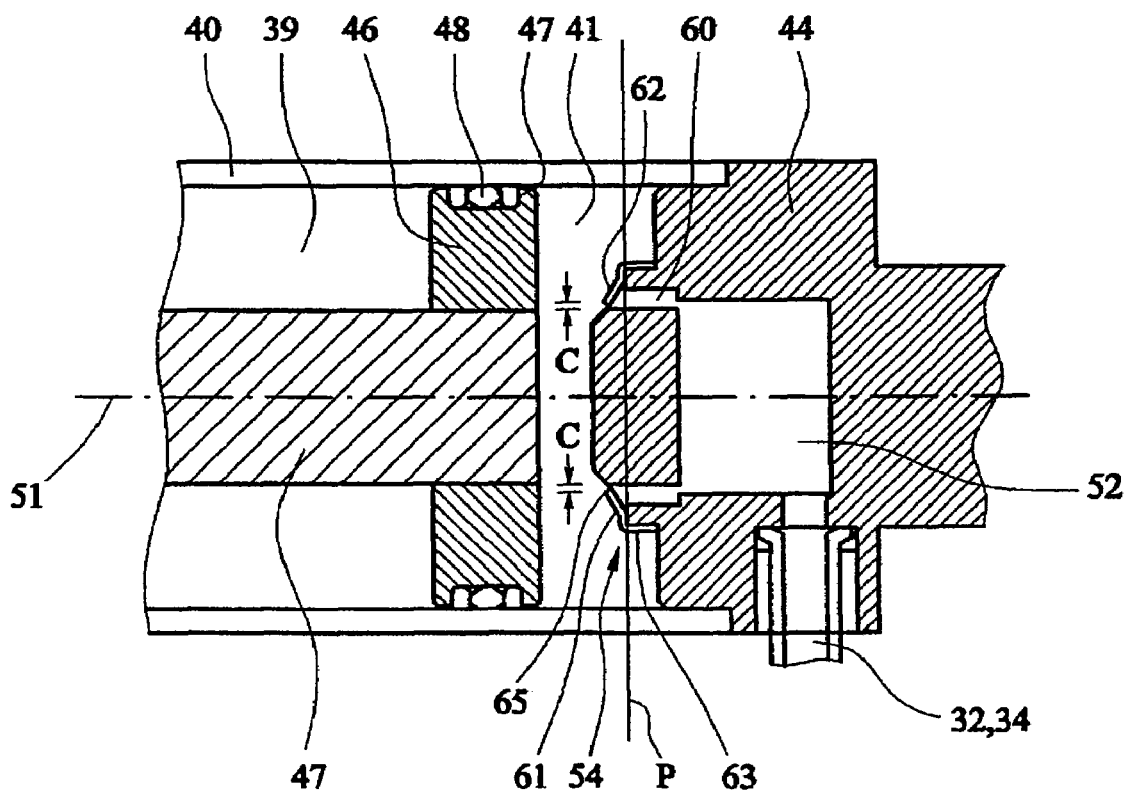
FIG. 4 is a more detailed cross sectional view of the valve end portion of the actuator shown in FIG. 3.

The respective actuators 12, 14 are generally similar in construction although may differ in size and detail, and comprise a double acting hydraulic piston 46 and cylinder 40 arrangement as shown in more detail in FIGS. 3 and 4.

The actuator 12, 14 comprises a tube 40 closed off at both ends by respective first and second end caps 42, 44 which are secured and sealed onto respective ends of the tube. A close fitting piston 46 is slidably located within the tube 40 with the periphery of the piston 46 sealing against an inner bore of the tube 40. A resilient O ring 48 may be provided within an annular recess 47 around the periphery of the piston 46 to provide and improved seal between the piston 46 and cylinder 40 bore. The piston 46 divides the interior of the cylinder 40 into two chambers 39, 41. An axially extending piston rod 47 is connected at one end to the piston 46 and extends through the first end cap 42. A mounting aperture 49 for a mounting bolt is provided in the other end of the piston rod 47, whilst a similar mounting aperture 49 for a further mounting bolt is provided in the second end cap 44, to connect and operatively attached the actuator 12, 14 to the seat 2. Conduits 50, 52 defined within each of the end caps 42, 44 interconnect the chambers 39, 41 within the cylinder 40 to the supply/return pipes 32, 34 which are connected to the respective end caps 42, 44 to allow hydraulic fluid to be supplied to, and flow from, the chambers 39, 41 to the supply/return pipes 32, 34.

System protection valves, generally indicated at 54 and 56, are provided for each conduit 50, 52 of each end cap 42, 44. In normal operation the system protection valves 54, 56 are open and allow a free flow of hydraulic fluid through the conduits 50, 52 and between the actuator chamber 39, 41 and supply/return pipes 32, 34 and remainder of the system 10. In a vehicle crash high instantaneous external loads and forces are applied to the seat 2, the movable portions thereof, and to the adjustment actuators 12, 14. These high loads will tend to try to move the seat 2 or moveable portions 4, 6 and to extend or retract the actuators 12, 14. The fluid within the actuator 12, 14, and actual significant movement of the actuator 12, 14, is though constrained and fluid prevented from flowing from the actuator 12, 14 to allow movement by the control valves. As a result, and due to the sudden application of the external high loads, a high pressure is generated within the actuator chambers 39, 41. The system protection valves 54, 56 are adapted to be activated in response pressure within the actuator 12, 14 exceeding a predetermined threshold level, preferably set just above normal operating pressures and characteristic of pressure generated during crash loading. When activated the system protection valves 54, 56 close off (or at least partially/significantly closes off) the respective conduits 52, 50 to hydraulically isolate the actuator 12, 14 and hydraulic fluid within the actuator 12, 14 from the remainder of the hydraulic circuit and adjustment system 10. The system protection valves 54, 56 thereby isolate and protect the remainder of the system 10 including pump 18, valves, and associated pipework and connectors from the high pressure which may be in the region of 1700 bar. In particular by locating the system protection valves 54, 56 within the actuators 12, 14 the parts of the system that are exposed and must withstand the high pressure generated during crash loading are minimised. Consequently only the actuator 12, 14 and system protection valves 54, 56 need to be designed to withstand the high pressures generated by such crash loading, and the remainder of the system 10 only needs to be designed and sized for the much lower normal operating pressures (typically 20 bar). Furthermore with the activated system protection valves 54, 56 closing off (or at least partially/significantly closing off) the respective conduits 50, 52 the fluid within the chambers 39, 41 cannot flow out of the actuator 12, 14. The movement of the piston 46 within the actuator 12, 14 under the crash loading is therefore prevented, and the seat 2, or portions 4, 6 of the seat 2 to which the actuator 12 is attached are securely held in place as required under the extreme cash loading.

Whilst under normal operation (ie. inactivated) the system protection valves 54, 56 are open and allow a free flow of hydraulic fluid through the conduits 50, 52, the system protection valves 54, 56 provide a slight restriction on flow over and past the valve 54, 56. Indeed in certain embodiments the valves 54, 56 can be configured (by narrowing the clearance in the normal operating positions) to provide a specified degree of restriction even in the normal operating condition. Such a controlled restriction under normal operation with the valves 54, 56 open limits the flow of fluid in particular through the return conduit. This advantageously limits the speed of the movement of the piston and actuator 12, 14, for example against the weight of the seat occupant, to prevent the seat adjustment from moving too fast. Too rapid movement of the seat, in particular by external loading (ie. by a seat occupant, or as a result of the weight of a seat occupant) can cause cavitation on the pressure side leading to free play within the system 10 and actuator 12, 14.

One of the system protection valves 54, 56, and the end cap 44 of the actuator 12, 14, is shown in more detail in FIG. 4. An end of the conduit 52 defined within the end cap 44 terminates in a generally annular duct 60 disposed coaxially about the axis of the actuator 12, 14 and opening onto the chamber 41. A valve element 62 is mounted coaxially over the end of the annular duct 60 adjacent the chamber 41. The valve element 62 comprises a frusto conical portion 61 and a flange 63 which extends from the base of the frusto-conical portion 61 and forms a cylindrical section which cooperatively engages on a rim around the periphery of the annular duct 60 to secure the valve element 62 to the end cap 44 and over the annular duct 60. The frusto conical portion 61 extends at an angle to an end plane P of the duct 60 perpendicular to the axis 51 of the duct 60. A distal inner edge of the frusto conical portion 61 is thereby axially spaced from the end plane P of the duct 60 and radially spaced from an inner periphery of the duct 60 such that there is an annular clearance C between the distal edge 65 of the frusto conical portion 61 and the inner periphery of the duct 60 through which fluid can flow between the chamber 41 conduit 52. When the actuator 12, 14 is subject to high crash loading the load on the piston 46 attempts to rapidly expel fluid form within the chamber 41 through the annular clearance C and past the valve element 62. The clearance C, which acts as a throttle, becomes chocked under such conditions and the pressure in the chamber 41 rises. When the pressure within the chamber 41 exceeds a certain level the frusto conical portion 61 is flattened and deformed by the applied pressure within the chamber 41 with the distal inner edge of the frusto conical portion 61 being bent axially and radially inwardly until the inner edge of the frusto conical portion 61 abuts against the inner periphery of the duct 60. This closes off (or at least partially/significantly closes off) the duct 60 preventing (or restricting) fluid flow from the chamber 41 and isolating the chamber 41 from the remainder of the system 10. The point at which the frusto conical portion 61 is flattened and deformed is determined by the strength and resilience of the valve element 62 and is set such that it is at the required predetermined pressure level, typically just above the operating pressure.

Figure 5:
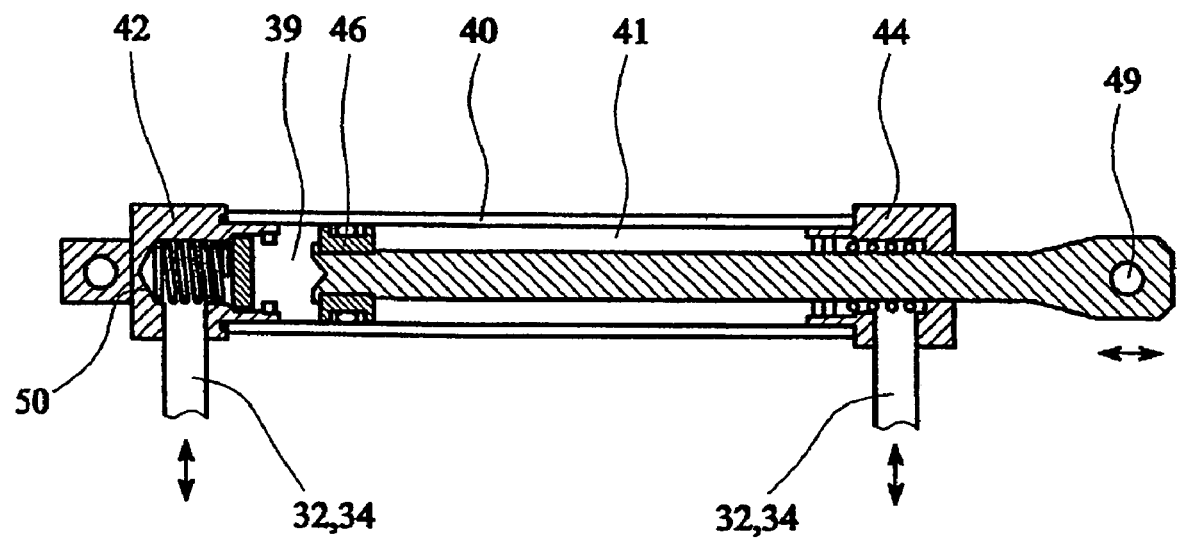
FIG. 5 is an illustrative cross section through one of the actuators shown generally in FIGS. 1 and 2 according to a second embodiment of the invention.
Figure 6:
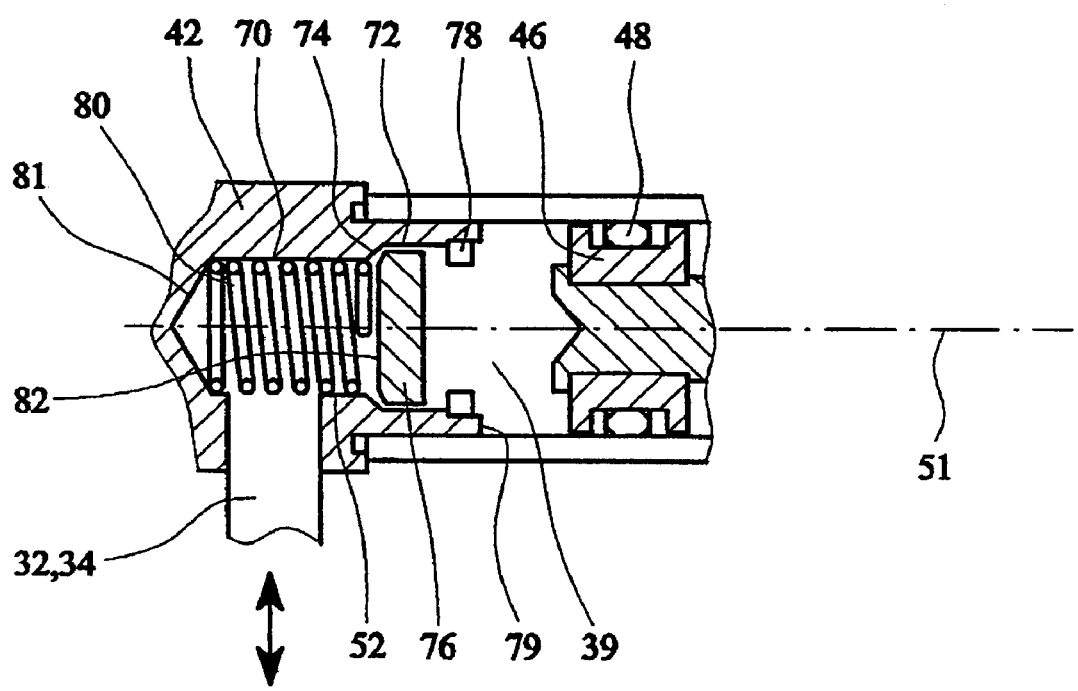
FIG. 6 is a more detailed cross sectional view of the valve end portion of the actuator shown in FIG. 6.

An actuator 12, 14 in accordance with a second embodiment of the invention and incorporating an alternative system protection valve 54, 56 arrangement is shown in FIGS. 5 and 6. This second embodiment and actuator 12, 14 is generally similar to the first embodiment. Like reference numerals are accordingly used for like components and only the difference, comprising the detail of the system protection valve 54, 56 will now be described.

In this embodiment the conduit 52 comprises a stepped cylindrical recess defined within the end cap 42 and extending axially with respect to the actuator axis 51. The cylindrical recess has a first smaller diameter section 70 leading to a larger diameter section 72 which has an end which opens onto the actuator chamber 39. An angled shoulder portion 74 is defined between and interconnects the two cylindrical sections 70, 72. The shoulder portion defines an angled ridge or lip. A movable closure element comprising a planar disc 76 loosely and moveably fits into the larger diameter section 72. The closure element 76 has a diameter which is greater then that of the small cylindrical section 70 but which is less than that of the larger section 72 such that the element 76 is freely axially movable. A retaining ring 78 located within an annular recess 79 and projecting radially inwardly at the end of the larger cylindrical portion 72 retains the closure element 78 within the larger cylindrical section 72. A coiled biassing spring 80 fitted into the smaller diameter section 70 abuts at one end against the closed end 81 of the cylindrical recess 70, and at the other end abuts against a face 82 of the closure disc 76 providing an axial biassing force urging the closure element 76 towards the annular chamber 39 so that the closure element 76 is spaced from the shoulder portion 74. As such there is a clearance between the shoulder portion 78 and the closure element 76 though which in normal operation hydraulic fluid can flow between the actuator chamber 39 and conduit 52 and remainder of the system 10. In the event of crash loading, and similarly to the first embodiment the clearance C, which acts as a throttle, becomes chocked under such conditions and the pressure in the chamber 39 rises as the crash load on the piston 46 attempts to force hydraulic fluid from the actuator chamber 39. When the pressure within the chamber 39 exceeds a certain level this overcomes the biassing force of the spring 30 and forces the closure element 76 to abut against the shoulder portion 74 and thereby close off the conduit 52. This prevents (or restricts) fluid flow from the chamber 39 and isolates the chamber 39 and actuator from the remainder of the system 10.

With this embodiment once the pressure within the actuator chamber 39 falls to a lower level below the predetermined threshold level, the biassing spring 80 will return the closure element 76 to its normal open position. Hydraulic fluid will then be free to flow allowing the system 10 to operate normally again. This avoids having to replace the actuator 12 due to activation of the system protection valve as the result of minor crash loading as is the case with the deformable valve embodiment described above. Accordingly, and furthermore since the closure element 76 returns to its normal position after activation the threshold limit for activation can be set much lower providing additional protection to the remainder of the system 10. With the deformable valve embodiment the threshold level has to be set higher to avoid false activation at pressures and loading where replacement of the actuator would not be warranted.

In the above description the system protection valves 54,56 are described as closing off the respective conduits 52,50 when activated to isolate the actuators 12,14 from the remainder of the system 10. It will though be appreciated that in other embodiments the system protection valves do not necessarily need to fully close off the conduits 50,52 and isolate the actuators 12,14 from the system 10 in order to achieve most, or at least the significant part of the benefits of the invention. The system protection valves 54,56 must only at least partially or significantly closes off the conduits 50,52, and a small degree of leakage past the valves 54,56 is acceptable. Even with incomplete or partial closing off of the valves 54,56 and some slight leakage when activated, the system protection valves 54,56 will when activated significantly throttle the flow of fluid past the valve. This will create a significant pressure drop over the valve 54,56 which may be sufficient to provide adequate protection and isolation of the remainder of the system 10 from the higher pressure generated within the actuators 12,14, and be sufficient to restrict the excessive fluid flow from the actuators 12,14 under crash loading. Accordingly through this application reference to the system protection valves 54,56 closing off and isolating the actuator 12,14 from the system 10 should not be considered to require complete closing and complete isolation, but to refer to providing sufficient closure and isolation to provide the required degree of protection and pressure reduction to protect the system 10 under anticipated crash loading and pressures generated within the actuator 12,14.

It will be appreciated that a number of further detailed modifications of the basic arrangement described and shown can be made, and in particular different further detailed system protection valve 54, 56 arrangements can be used which operate in a similar functional manner.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A hydraulic vehicle seat adjustment system for providing powered adjustment of the position of a seat or seat portion, the system comprising arranged in a hydraulic circuit:
   a pump for generating a flow of pressurised hydraulic fluid;
   a flow controller for controlling and directing the flow of pressurised hydraulic fluid; and
   a hydraulic actuator comprising a first inlet/outlet and a second inlet/outlet, the actuator adapted to move the seat portion in response to a flow of pressurised hydraulic fluid directed to and from the first inlet/outlet and second inlet/outlet by the flow controller;
   wherein the actuator comprises a first system protection valve for the first inlet/outlet of the actuator and second system protection valve for the second inlet/outlet of the actuator; the first and second system protection valves are adapted to be activated in response to pressure within the actuator exceeding a predetermined threshold level, and when activated are adapted to at least partially close off the respective inlet/outlet to hydraulically isolate the actuator and hydraulic fluid within the actuator from the remainder of the hydraulic circuit and adjustment system.

2. A hydraulic vehicle seat adjustment system as claimed in claim 1 in which:
   an actuator chamber is defined within the actuator and an end of the respective inlet/outlet is in fluid communication with the actuator chamber; and
   the system protection valves each comprise a movable closure portion which extends over the end of the inlet/outlet and is movable from a first position to a second activated position; in the first position the closure portion is spaced from the end of the respective inlet/outlet to allow fluid flow between the actuator chamber and inlet/outlet through the respective end of the inlet/outlet; and in the second activated position the closure portion abuts against and at least partially closes off the respective inlet/outlet.

3. A hydraulic vehicle seat adjustment system as claimed in claim 2 in which in the closure portion is deformably mounted within the respective actuator and spaced from the end of the respective inlet/outlet, and in which the pressure of hydraulic fluid within the actuator when the pressure exceeds the predetermined threshold level is adapted to deform the mounting of the closure portion to activate the respective system protection valve and move the closure portion to the second position.

4. A hydraulic vehicle seat adjustment system as claimed in claim 2 in which the closure portion is biassed into the first position by a biassing spring which provides a predetermined biassing force which has to be overcome by pressure within the actuator chamber to activate the respective protection valve.

5. A hydraulic vehicle seat adjustment system as claimed in claim 2 in which the spacing of the closure portion from the respective end of the inlet/outlet defines a conduit of a reduced cross sectional flow area which throttles the flow of hydraulic fluid through the inlet/outlet.

6. A hydraulic vehicle seat adjustment system as claimed in claim 1 in which an end of each inlet/outlet comprises an annular duct, each system protection valve comprises a frusto-conical element mounted coaxially over the respective duct such that a distal portion of the frusto-conical element is spaced from a plane perpendicular to an axis of the duct; the frusto-conical element is adapted to be deformed and flattened to a planar shape by hydraulic pressure within an actuator chamber when the pressure exceeds the predetermined threshold level such that the flattened element covers and at least partially closes off the duct.

7. A hydraulic vehicle seat adjustment system as claimed in claim 1 in which the pressure within the actuator exceeding a predetermined threshold level is generated by applied external crash loading and movement of the actuator.

8. A hydraulic vehicle seat adjustment system as claimed in claim 1 in which the pressure within the actuator exceeding the predetermined threshold level is generated by an induced required flow through the inlet/outlet exceeding a predetermined level.

9. A hydraulic vehicle seat adjustment system as claimed in claim 2 in which the closure portion is moved by the pressure of the hydraulic fluid within the actuator chamber when the pressure exceeds the predetermined threshold level.

10. A hydraulic vehicle seat adjustment system as claimed in claim 1 in which the actuator comprises a double acting piston mounted within a cylinder.

11. A hydraulic vehicle seat adjustment system as claimed in claim 10 in which a pair of end caps is attached to the cylinder and which close off either end of the cylinder, the first and second inlet/outlets are defined by respective conduits within the respective end caps, and the first and second system protection valves comprise part of the respective end caps.

12. A hydraulic vehicle seat adjustment system as claimed in claim 1 in which a plurality of actuators is adapted to move a respective plurality of seat portions of a vehicle seat; and in which a plurality of corresponding flow controllers control and direct the flow of pressurised hydraulic fluid to corresponding actuators.

13. A hydraulic vehicle seat adjustment system as claimed in claim 1 in which the seat comprises a movable seat back and the actuator is adapted to move the seat back and to adjust and set an angle of the seat back.

14. A hydraulic vehicle seat adjustment system as claimed in claim 1 in which the actuator is adapted to move the fore and aft position of the seat within the vehicle.

15. A hydraulic vehicle seat adjustment system as claimed in claim 1 in which the first and second system protection valves are adapted when inactivated to provide a controlled restriction in use on a flow of hydraulic fluid through the respective inlet/outlet.

* * * * *